United States Patent [19]

Paitula et al.

[11] 4,119,281

[45] Oct. 10, 1978

[54] SPINDLE, PARTICULARLY FOR WINDING UP A STRAP IN A SAFETY BELT FOR VEHICLES

[75] Inventors: Hannu Olli Paitula, Järna; Roland Axel Larsson, Södertälje, both of Sweden

[73] Assignee: Gränges Essem Aktiebolag, Vësterås, Sweden

[21] Appl. No.: 765,283

[22] Filed: Feb. 3, 1977

[30] Foreign Application Priority Data

Feb. 3, 1976 [SE] Sweden ................................ 7601102
Jan. 19, 1977 [SE] Sweden ................................ 7700539

[51] Int. Cl.² ...................... B65H 75/48; B65H 75/28
[52] U.S. Cl. ........................................ 242/107; 242/74
[58] Field of Search ......... 242/74, 74.1, 107, 107.4 R, 242/107.4 A, 107.4 B, 107.4 C, 107.4 D, 107.4 E

[56] References Cited

U.S. PATENT DOCUMENTS

| | | | |
|---|---|---|---|
| 2,182,398 | 12/1939 | Gantner | 242/74 |
| 3,202,379 | 8/1965 | Wrighton | 242/107.4 B |
| 3,214,218 | 10/1965 | Gill | 242/107.4 B X |
| 3,361,380 | 1/1968 | Mizutani | 242/74 |
| 3,659,800 | 5/1972 | Meyer | 242/107.4 A |
| 3,802,641 | 4/1974 | Saito | 242/107.4 R |

FOREIGN PATENT DOCUMENTS

| | | | |
|---|---|---|---|
| 378,347 | 1/1940 | Italy | 242/74 |
| 379,354 | 3/1940 | Italy | 242/74 |

*Primary Examiner*—Edward J. McCarthy
*Attorney, Agent, or Firm*—Browdy and Neimark

[57] ABSTRACT

A spindle, particularly for winding up a strap in a safety belt for vehicles, comprising a first portion which is provided with an opening for the strap and which is arranged to give the spindle the necessary strength, and a second portion which together with the first portion forms a spindle having a substantially round cross section.

13 Claims, 9 Drawing Figures

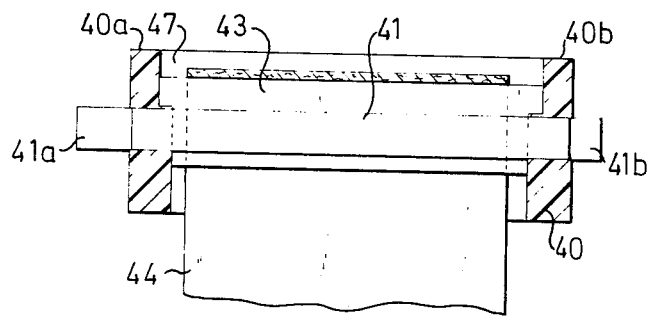
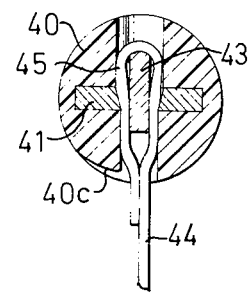
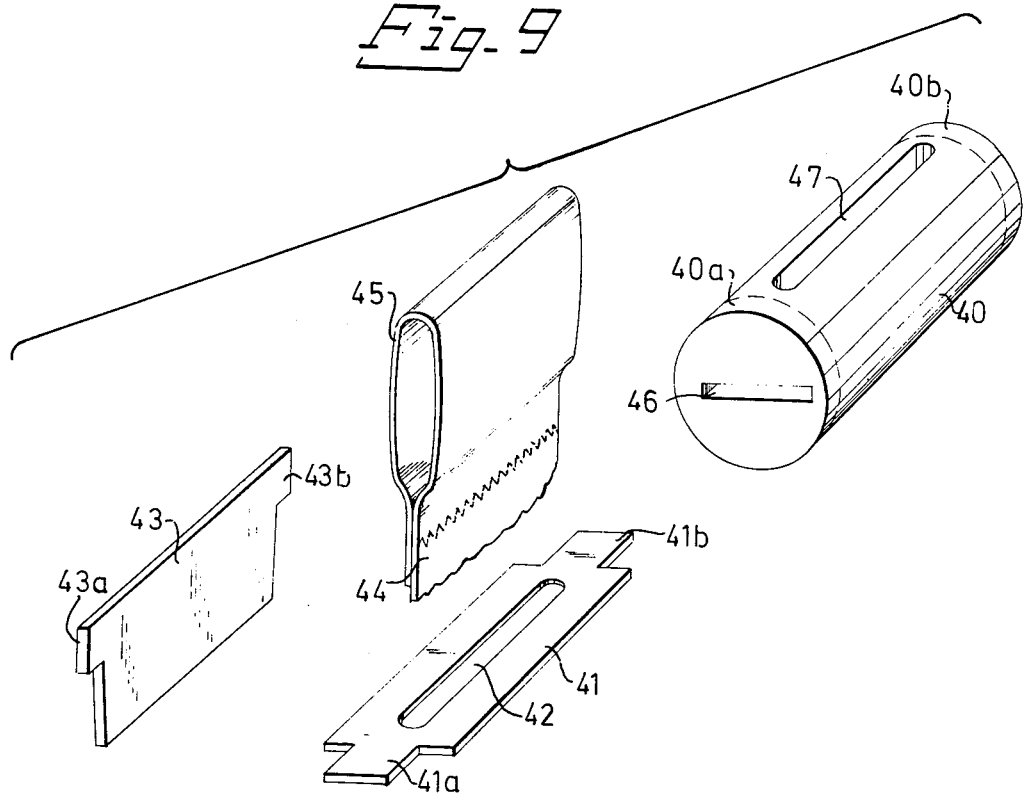

SPINDLE, PARTICULARLY FOR WINDING UP A STRAP IN A SAFETY BELT FOR VEHICLES

The present invention is related to a spindle which is particularly intended for winding up a strap in a safety belt for vehicles but wich can also be used for winding up other objects, when it is desirable that the coil shall have a round, preferably a circular, cross section.

In safety belt devices for vehicles, and particularly for motor vehicles, it is desirable to manufacture the spindle of steel in order to obtain a high strength. For manufacturing reasons, it is in such cases desirable to manufacture the spindle of sheet of steel, because the spindle then can be produced in a continuous process by punching and bending steel sheet blanks.

It is previously known to manufacture the spindle of sheet of steel by bending the steel sheet blank to a substantially cylindrical shape and leaving a space between the opposite edges of the bent sheet blank in order to enable the insertion of the safety belt strap, so that the strap end can be locked in the cavity formed within the spindle by means of a locking body inserted into a loop formed of the strap end. Because relatively thick steel sheet is to be used for strength reasons, it is difficult to manufacture with sufficient accuracy spindles consisting of a steel sheet blank bent to a cylindrical shape. It is essential to give the spindle a cross section such that the strap wound up on the spindle forms a substantially circular coil, because deviations from the circular shape are easily noticeable when extracting the strap from the coil. In case of an unround shape the extraction of the strap will be jerky, because the necessary extraction force varies periodically during the course of the extraction.

The main object of the invention is to provide a spindle which is easy to manufacture and therefore has low manufacturing costs and which has a high strength and a substantially round cross section, so that a smooth and jerky-free extraction of the strap wound up on the spindle can be obtained.

The invention is based upon the fundamental idea that the spindle should be formed of two separate portions, one portion giving the necessary strength and the other portion completing the first portion, so that the spindle as a whole obtains a substantially circular cross section. By this division, the portion providing the strength can be manufactured of metal sheet, particularly steel sheet, which can be formed with regard to the requirements of strength and simplicity in manufacturing but without regard to the requirement that the spindle shell have a circular cross section. The last mentioned requirement is fulfilled by designing the second portion of the spindle so that this portion alone or together with the first portion gives the spindle as a whole a substantially circular shape. The second portion can preferably be manufactured of another material, for instance plastics or a similar material, because the strength requirements on the second portion are substantially lower due to the fact that the first portion has been designed to take up the appearing tensions. When manufacturing such spindles, it is for manufacturing reasons desirable to avoid heavy bending of the metal sheet blanks giving the strength and to use substantially plane parts or elements. At the same time it is desirable to provide a spindle which has the same strength with regard to bending and torsion in all directions.

A further object of the invention is, therefore, to provide an improved spindle of the type set forth in which the metal sheet parts providing the strength are plane or only slightly bent and which, nevertheless, has a uniform and high strength with regard to bending and torsion in all directions.

The improved spindle according to the invention is based on the idea that the portion providing the strength of the spindle should be formed of at least two, preferably plane metal sheet parts of which one is penetrating the other, so that a cross is formed. The metal sheet parts cooperate, so that a strength which is substantially uniform in all directions is obtained. The desired round shape of the spindle is obtained by means of a bobbin which surrounds the metal sheet parts and on which the strap is wound up.

The penetrating metal sheet part is the locking means for the strap end, thus providing an effective cooperation between the metal sheet parts among themselves and between the metal sheet parts and the bobbin due to the tension in the strap. The appearing stresses are then absorbed in such a way that the torsion and bending stresses are absorbed by the metal sheet parts and the tension in the strap is absorbed by the bobbin. From the point of view of strength, a good use of the material is obtained in this way.

A few different embodiments of the invention shall now be described in detail below with reference to the attached drawings.

FIG. 7 is a side view, partly in section, of a wind up spindle according to the invention.

FIG. 8 is a cross section view of the spindle according to FIG. 7.

FIG. 9 is an exploded view of the spindle according to FIG. 7.

Figure 1:
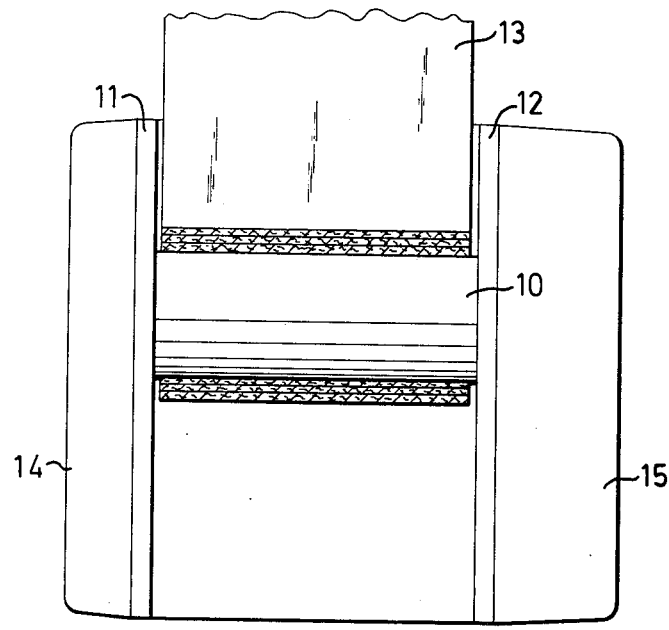
FIG. 1 is a front view of a winding up device for a safety belt, the turns of the strap wound up on the spindle being cut away to more clearly show the spindle.

The winding up device for a safety belt shown in FIG. 1 comprises a spindle 10 which is journalled in bearings in two walls 11, 12 and on which the strap 13 of the seat belt is wound up, when the seat belt is not used. The winding up of the strap is provided by means of a spring (not shown) which is positioned in the cover 14, shown on the left side of the figure, and which is tensioned when extracting the strap. The winding up device is also provided with means (not shown) for locking the spindle in order to prevent further extraction of the strap in case of a hard braking of the vehicle or a collision. These means are provided in the cover 15, shown on the right side of the figure.

Figure 2:
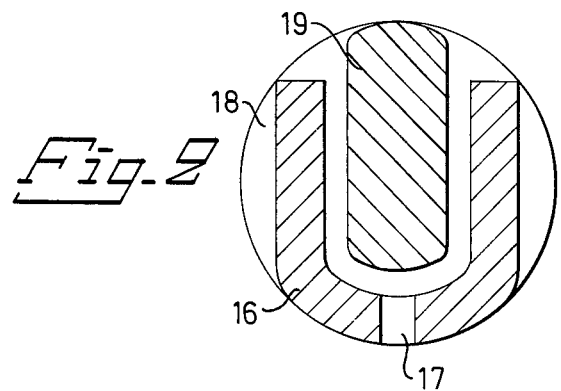
FIG. 2 is a cross section view of a spindle according to the invention.

The spindle shown in cross section in FIG. 2 comprises a U-shaped part 16 manufactured of bent steel sheet, preferably having a thickness of 3-4 mm. The bottom of the U-shaped part is provided with a punched slot 17 through which the strap can pass. The desired circular shape of the spindle has been indicated by means of a circle line 18 surrounding the U-shaped part 16. In the U-shaped part a second part 19 is positioned which second part preferably can consist of plastics or a similar material. This second part 19 has a thickness larger than the width of the slot 17, so that the part 19 cannot pass through the slot, and a height so that it extends substantially to the surrounding circular line 18. The part 19 is intended to be a locking body for the end of the strap 13 of the safety belt, as shown in FIG. 3.

Figure 3:
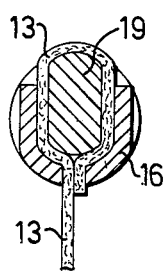
FIG. 3 shows the way of attaching the strap to the spindle shown in FIG. 2.

FIG. 3 shows how the end of the strap 13 is bent to a closed loop, the edge of the strap end being attached to the strap. The locking body 19 is inserted into this loop, so that the end of the strap cannot be withdrawn through the slot in the bottom of the U-shaped portion. The spindle as a whole has a substantially circular cross section, when the locking body 19 and the strap 13 are positioned in the U-shaped part 16. The small deviations appearing, for instance due to the fact that the legs of the U-shaped part are straight and due to the presence of the space between the top edges of the legs and the locking body with the strap loop, are so minor that they do not have any noticeable influence on the extraction of the strap. The strap coil wound on the spindle thus obtains a substantially circular shape.

Figure 4:
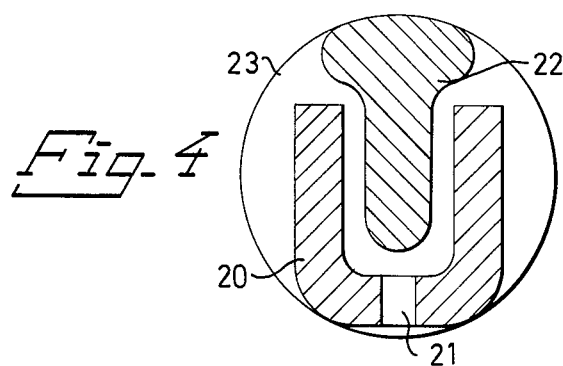

FIG. 4 shows a somewhat modified design of the parts forming the spindle. This embodiment has also a U-shaped part 20 with a slot-like opening 21 in the bottom. However, the legs of the U-shaped part are shorter than the legs in the embodiment shown in FIG. 2, and the second part 22 which is positioned in the U-shaped part and which also is intended to be a locking body for the end of the strap has a substantially T-shaped cross section. The crossing top portion of the locking body is provided with a convex outer surface for better agreement with the desired circular shape of the spindle as a whole.

If desirable, the embodiment shown in FIG. 4 can be designed to agree even closer with the desired circular cross section by forming the legs of the U-shaped part arcuate instead of straight along the surrounding circular line 23. The crossing portion of the locking body 22 than has to be made correspondingly larger to complete the U-shaped part to a spindle having a periphery running substantially along the desired circular line.

Figure 5:
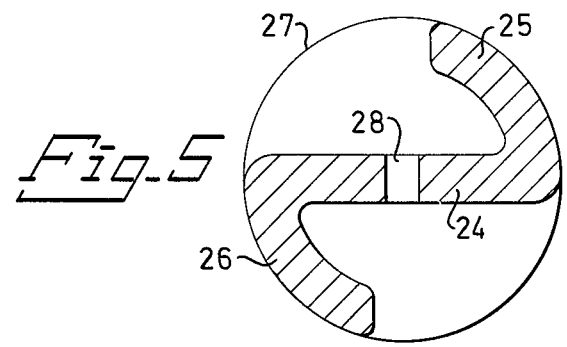

FIG. 5 shows another modified embodiment of the spindle according to the invention. The part providing the strength of the spindle is in this embodiment substantially Z-shaped with a straight rib 24 and two arcuately bend end portions 25, 26. Also in this figure the desired circular cross section of the spindle has been indicated by means of a circular line 27. The locking body necessary for locking the end of the strap has not been shown but is intended to be positioned on one side of the rib and to complete the space between the edge of the end portion and the rib, so that the spindle is completed to the indicated circular line. On the other side of the rib, a corresponding body can be positioned or the end portion can be prolonged, so that the space between the edge of the end portion and the rib is so small that it is without practical importance for the shape of the strap coil. Also in this embodiment a slot 28 is provided for the strap.

Figure 6:
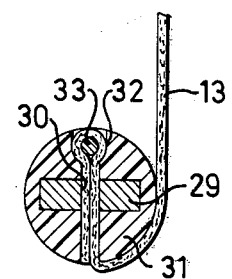
FIGS. 4–6 are cross section views of other embodiments of the spindle according to the invention.

In the embodiments shown in FIGS. 2–5, the part providing the strength has been manufactured by bending heavily a steel sheet blank which will give a high and substantially uniform strength in different directions of the spindle. However, it is not necessary to bend the steel sheet blank used to give the spindle the necessary strength. One example of an embodiment having a plane steel plate as a carrying or strength providing means is shown in FIG. 6. In this embodiment a plane steel plate 29 is used which is provided with a thorough slot 30 for the strap in the same way as in the previously described embodiments. In this case, however, the steel plate is inserted into a body 31 of plastics which has been given a substantially circular cross section. This body of plastics is provided with an opening 32 which corresponds to the slot in the steel plate and which has one end enlarged for receiving the strap end loop and a locking pin 33 for this loop. In this case, the part providing the strength in the spindle can be split up into two or even more separate elements which are all moulded into the body of plastics. In such a case it is not necessary to punch a slot through a steel plate, because the opening necessary for the strap can easily be provided between two steel sheet elements.

With the embodiment of the spindle shown in FIG. 6 it is difficult to obtain a uniform strength with regard to bending and torsion in all directions. This drawback can be avoided with the embodiment shown in FIGS. 7–9 while maintaining the advantage of using plane parts or plates.

The spindle shown in FIGS. 7–9 comprises a cylindrical bobbin 40 of plastics which has a substantially circular cross section and in which is inserted an elongated strengthening steel sheet plate, the ends 41a, 41b of which extending on both sides of the bobbin for connection to a spring for automatically winding up of the strap of the seat belt, when the seat belt is not used, and for connection to an automatically locking device for preventing the extraction of strap from the spindle for instance in case of hard braking of the vehicle, respectively. As shown in FIG. 9, the steel plate 41 is provided with a slot running in the longitudinal direction of the plate and extending along substantially the whole length of the plate. A second elongated steel plate 43 is arranged to be inserted into the slot 42 of the first mentioned steel plate 41 and to serve at the same time as a locking device for the end of a strap 44 of a safety belt. The end of the strap is formed to a loop 45 in which the steel plate 43 is inserted before the penetration into the slot 42 of the steel plate 41. For this purpose, the slot has a width which is substantially the sum of the thickness of the plate 43 and twice the strap thickness.

As shown in FIG. 9, the plate 43 is designed substantially as a T, the upper portion of the plate being provided with two ears 43a and 43b extending in the plane of the plate. The lower portion of the plate is shorter than the slot 42, and the upper portion with the ears 43a and 43b of the plate is longer than the slot 42, so that the plate cannot pass through the slot, but after insertion into the slot is abutting the plate 41 by the ears 43a and 43b. The lower portion of the plate 43 can be somewhat wedge-shaped in order to facilitate the insertion of the plate 43 into the slot 42 of the plate 41. Due to the tension in the strap running around the plate 43 a strong abutment is provided between the plates, so that the plates will cooperate for absorbing the torsion and bending stresses in the spindle.

The bobbin 40 forms the envelope surface of the spindle on which the strap of the safety belt is wound and is provided with two thorough slots 46, 47 perpendicular to each other and running in the longitudinal direction of the bobbin. The slot 46 is intended to receive the plate 41, and the slot 47 is intended to receive the strap loop 45 and the plate 43 inserted into the loop. The slot 47 is somewhat longer than the upper portion of the plate 43. When assembling the spindle, the plate 41 is first inserted into the slot 46, until the slot 42 of the plate 41 is in line with the slot 47 of the bobbin 40. The loop 45 is then passed through the slot 47 from beneath, until it extends sufficiently above the upper edge of the bobbin to enable the insertion into the loop of the plate 43 operating as a locking means. When the plate 43 has been inserted into the loop 45, the loop and plate are drawn into the bobbin by pulling the strap.

The ring shaped surfaces 40a, 40b at the ends of the bobbin are intended to serve as bearing surfaces for rotatably journalling the spindle in two opposite walls or similar elements in a wind up device unit for the safety belt. One edge 40c at the exit opening of the bobbin slot 47 is slightly bevelled in order to avoid a stepwise transit from one coil turn to the following turn.

When the spindle is assembled, the parts 40, 41, 43 of the spindle and the strap loop 45 have the relative positions indicated in the cross section through the spindle shown in FIG. 8. In the shown embodiment, the plate 43 has a height which is slightly less than the width of the plate 41, so that the vertical portion (in FIG. 8) of the cross formed by the plates is slightly less than the horizontal portion. However, the plates can preferably be so designed that the four arms of the cross have substantially the same length.

It is evident that even if only a few embodiments have been shown and described above, a large number of different embodiments and modifications are possible within the invention. The portion providing the strength must not necessarily be of steel sheet but can be of any other metal or metal alloy or any other material having the desired strength and working properties. The use of a metal sheet blank is advantageous, because the portion then can be manufactured in a continuous manufacturing process by cutting, punching and bending. The other portion must not necessarily be of plastics, but can be of another suitable material which can be formed in an easy and cheap way to the shape necessary for completing the metal sheet portion to a spindle unit having a substantially circular cross section.

Irrespective of which embodiment has been chosen for the spindle, the spindle easily can be provided with bearings for rotatably journalling in the walls of the wind up device or in other means or elements of the wind up device for carrying the spindle. The bearing surfaces can e.g. be surfaces on the bobbin or special bearing rings attached to the bobbin.

What is claimed is:

1. A spindle, particularly for winding up a strap in a safety belt for vehicles, comprising:
    a first portion, including at least one metal sheet plate which is provided with a through slot for the strap, which gives the spindle the necessary strength, said first portion consisting of a single metal sheet plate which is bent to substantially U-shape; and
    a second portion which together with the first portion forms a spindle having a substantially round cross section.

2. A spindle according to claim 1, wherein said U-shaped first portion has relatively long straight legs and said locking body has a substantially rectangular cross section the shorter sides of which are slightly convex.

3. A spindle, particularly for winding up a strap in a safety belt for vehicles, comprising:
    a first portion, including at least one metal sheet plate which is provided with a through slot for the strap, which gives the spindle the necessary strength, said first portion consisting of a single metal sheet plate which is at leat partly arcuate; and
    a second portion which together with the first portion forms a spindle having a substantially round cross section, said second portion being arranged to be surrounded by the end of the strap to thereby operate as a locking body for the strap, said second portion extending from said first arcuate portion and completing the outer periphery of the arcuate portion to a substantially closed ring.

4. A spindle according to claim 3, wherein said U-shaped first portion has relatively short legs and said locking body is substantially T-shaped, the crossing portion of the locking body being arranged to complete the periphery of the U-shaped portion to a substantially closed ring.

5. A spindle, particularly for winding up a strap in a safety belt for vehicles, comprising:
    a first portion, including at least one metal sheet plate which is provided with a through slot for the strap, which gives the spindle the necessary strength, said first portion consisting of a single metal sheet plate which is substantially Z-shaped having a rib with two ends extending from the rib and directed in different directions with regard to the rib; and
    a second portion which together with the first portion forms a spindle having a substantially round cross section.

6. A spindle according to claim 5, wherein said second portion is arranged to be surrounded by the end of the strap, to thereby operate as a locking body for the strap, said locking body being positioned on one side of said rib and substantially covering the opening between the edge of the adjacent end of said metal sheet plate and said rib.

7. A spindle, particularly for winding up a strap in a safety belt for vehicles, comprising:
    a first portion, including at least one metal sheet plate which is provided with a through slot for the strap, which gives the spindle the necessary strength, said first portion comprising at least one planar metal plate; and
    a second portion which together with the first portion forms a spindle having a substantially round cross section, said second portion surrounding and holding said first portion and having a round cross section and two bearing surfaces.

8. A spindle according to claim 7, wherein said first portion comprises two elongated planar metal sheet plates of which the first is provided with a slot which runs in the longitudinal direction of said plate and said second plate passes through said slot, whereby the plates form a cross having four arms, said second plate forming a locking means for the end of the strap.

9. A spindle according to claim 8, wherein said plates are perpendicular to each other.

10. A spindle according to claim 8, wherein all of said arms of said cross have substantially the same length.

11. A spindle according to claim 8, wherein said second plate is substantially T-shaped.

12. A spindle according to claim 8, wherein the width of the slot is substantially the same as the sum of the thickness of said second plate and twice the thickness of the strap, whereby the strap of the seat belt can run in a loop around said second plate, when said second plate is inserted into said first plate.

13. A spindle according to claim 7, wherein said second portion has a circular cross-section and the ends of said second portion form the bearing surfaces of the spindle.

* * * * *